United States Patent [19]

Milanowski et al.

[11] Patent Number: 5,285,515
[45] Date of Patent: Feb. 8, 1994

[54] ADAPTABLE CASSETTE FOR COILING AND SPLICING OPTICAL FIBERS

[75] Inventors: Michel Milanowski, Anserville; Alain Vincent, Juilly, both of France

[73] Assignee: Mars Actel, Vrigne Aux Bois, France

[21] Appl. No.: 21,477

[22] Filed: Feb. 22, 1993

[30] Foreign Application Priority Data

Feb. 21, 1992 [FR] France .................. 92 02028

[51] Int. Cl.⁵ .................. G02B 6/00; G02B 6/36
[52] U.S. Cl. .................. 385/135; 385/147
[58] Field of Search ............. 385/134, 135, 136, 137, 385/138, 139, 140, 147

[56] References Cited

U.S. PATENT DOCUMENTS

| | | | |
|---|---|---|---|
| 4,840,449 | 6/1989 | Ghanderharizadeh | 350/96.20 |
| 4,846,565 | 7/1989 | Swanson et al. | 350/96.22 |
| 5,066,149 | 11/1991 | Wheeler et al. | 385/135 |
| 5,100,221 | 3/1992 | Carney et al. | 385/135 |
| 5,109,467 | 4/1992 | Hogan et al. | 385/135 |
| 5,115,489 | 5/1992 | Norris | 385/135 |
| 5,167,001 | 11/1992 | Debortoli et al. | 385/135 |
| 5,206,927 | 4/1993 | Finzel et al. | 385/135 |
| 5,222,183 | 6/1993 | Daems et al. | 385/135 |

OTHER PUBLICATIONS

Patent Abstracts of Japan, vol. 9, No. 304 (P-409)(2027) Nov. 30, 1985 & JP-A-60 136 710 (Furukawa Denki Kogyo).

Primary Examiner—Akm E. Ullah
Attorney, Agent, or Firm—Sughrue, Mion, Zinn, Macpeak & Seas

[57] ABSTRACT

The cassette has a bottom on which holding means are provided for holding optical fiber connections thereon, and optionally on which a cylinder is provided for coiling the fibers. The bottom includes different sets of openings. Either two connection supports chosen from different supports, or else one of said different connection supports and said cylinder are removably mounted side-by-side in two of said sets of openings, the supports and the cylinder having respective sets of snap-fastening catches corresponding to respective sets of openings. The cassette is thus made adaptable to being used in different ways.

11 Claims, 6 Drawing Sheets

ADAPTABLE CASSETTE FOR COILING AND SPLICING OPTICAL FIBERS

The present invention relates to devices for coiling and splicing optical fibers. Such devices may be termed "cassettes", and they are referred to as such below.

BACKGROUND OF THE INVENTION

Such cassettes are essentially used to store surplus lengths that are left on fibers for connection purposes, and to protect coils of said surplus lengths and the connections or "splices" between the optical fibers. Each cassette is assigned to connecting together two fibers, or preferably to connecting a plurality of fibers respectively to a plurality of other fibers.

Each cassette must also ensure that the radius of curvature of the surplus lengths does not drop below a minimum, either where they are coiled inside the cassette or where they enter the connections. The cassette must also make it easy to handle the coiled surplus lengths and the connections, for the purpose of installing them in the cassette and for any subsequent maintenance.

Document FR-A-2 646 928 describes such a cassette used in a connection module for connecting together optical fiber cables. That cassette includes a bottom surrounded by a discontinuous peripheral rim. Accesses for the fibers are thus delimited in the rim. In that method of using the cassette, a cover closes both the cassette and the module at the same time.

The bottom of that cassette delimits a connection support at a location provided on the bottom for that purpose substantially in a first half of the middle portion of the bottom. The support serves as a housing and retains the connections between the fibers received in the cassette. The support is formed with ribs on its bottom, which ribs delimit said location. Two of the ribs that face each other have corresponding slots in which the connections are retained.

The bottom also delimits a projecting cylinder substantially in the other half of its middle portion. The fibers are coiled around the cylinder which guides them and returns them with no less than the minimum required radius of curvature.

That cassette further includes tabs folded inwards on the rim. The coiled surplus lengths are retained underneath the tabs between the cylinder and the rim.

That cassette is used in such a way that the fibers that are received and coiled in the cassette are bare fibers. In other ways of using cassettes which operate in analogous manner to the preceding cassette, the received fibers may also be bare, or they may be protected in individual sheathing tubes, but they do not need coiled surplus lengths to be guided and returned by the above-mentioned cylinder. Such a cylinder then clutters the surface of the bottom unnecessarily, and is a hindrance when the fibers and the connections are being handled.

In the cassette described in that document, the connection support delimited on the bottom can also only be used with fiber connections that are adapted to that support. However, different types of connection may be used with dimensional and/or mechanical characteristics that differ from one type to another. The following existing different types of connection are given by way of example: connections sold under the trademark "Fibrlok" by 3M and connections sold under the trademark "Placoptic" by Alliance Technique Industrielle, having protective sheaths that are more or less rigid. In a variant the connections can be performed by welding the fibers together and protecting each weld with a flexible sheath. The different types of connection may be used selectively depending on how the cassettes are used, and on the different requirements with respect to their specific characteristics. Different supports correspond to the different types of connection.

The requirements relating to coiling and connecting optical fibers inside cassettes lead to specific cassettes being made, and as a result have repercussions on manufacturing costs and methods.

OBJECT AND SUMMARY OF THE INVENTION

An object of the present invention is to avoid such drawbacks, by rendering such cassettes adaptable to the specific needs and requirements of use.

The invention provides an adaptable cassette for coiling and splicing optical fibers, said cassette including a bottom, a discontinuous rim substantially around the periphery of the bottom, retaining tabs on the rim, with the fibers being held underneath the tabs, holding means for holding optical fiber connections on the bottom, a closing cover attached to the rim, and optionally a cylinder on the bottom so that the fibers can be coiled around the cylinder and/or against the rim; wherein said bottom is plane and includes, at least on one side of a middle longitudinal axis, a first set of openings assigned to the optional removable fixing of said cylinder on said bottom, and, symmetrically on either side of said middle longitudinal axis, a plurality of openings cooperating to define a plurality of different second sets of openings, each set being assigned to the removable fixing of a connection support chosen from different supports, and selectively constituting said holding means, and wherein said cylinder is provided with a set of snap-fastening catches which fasten into said first set of openings, and each of said different supports is provided with its own set of snap-fastening catches which fasten into one of said second sets of openings.

The cassette of the invention may further have at least one of the following additional features:
- it includes said cylinder and one of said different supports mounted on said bottom on either side of said middle longitudinal axis, or two of said supports mounted on said bottom on either side of said middle longitudinal axis;
- each of said second sets of openings is formed by three openings, one opening being centered on the middle transverse axis of the bottom, and the other two openings being symmetrical about said transverse axis and being referred to as "side openings", and the set of snap-fastening catches on each of said supports is formed by three snap-fastening catches;
- said second sets of openings are defined on either side of said longitudinal axis by two side openings adjoining said rim, two other side openings facing the preceding openings but offset from the rim, and a series of third openings centered on said transverse axis;
- the set of snap-fastening catches on each support is defined by two rigid catches received in the two side openings of the set of openings in question, and an elastically deformable catch received in the central opening of said set of openings in question; and
- at least one of said different supports includes a first set and a second set of individual retaining means for respectively retaining first and second connections, on which support said first set extends in two first parallel rows situated substantially between the ends of two first edges of the support and assigned to retaining the first connections between the two first rows, and said second set extends in a third row parallel to and between said first parallel rows, and assigned to retaining the second connections on the third row and making said first rows inactive, and in that said third row is fixed to said first edges of the support by end fastenings of small cross-section and made breakable, so that the third row can be removed when said first connections are selected.

BRIEF DESCRIPTION OF THE DRAWINGS

The characteristics and advantages of the present invention appear from the following description of embodiments of adaptable or adapted cassettes given with reference to the accompanying drawings, in which.

MORE DETAILED DESCRIPTION

Figure 1:
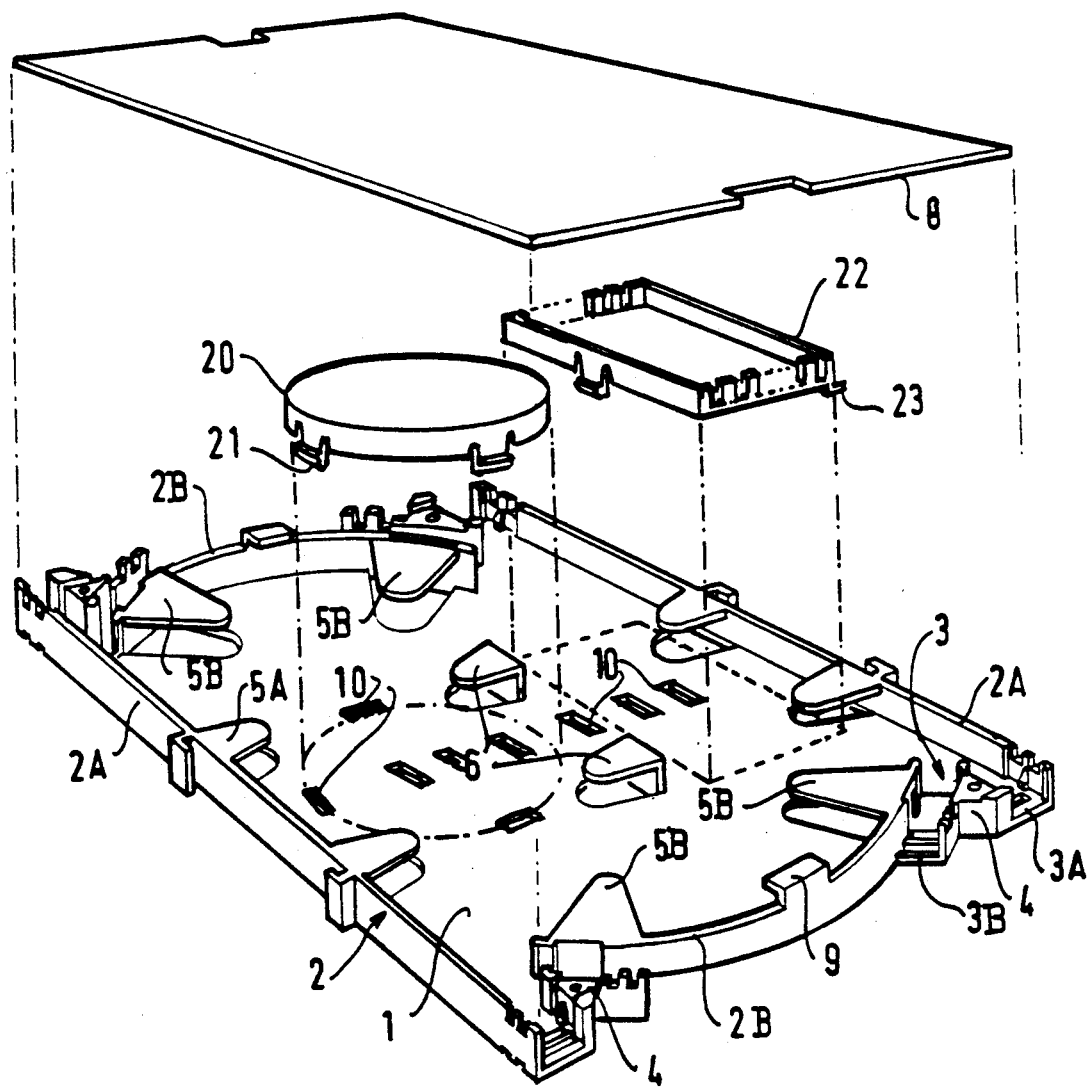
FIG. 1 is a perspective view of an adapted cassette of the present invention defining a first type of cassette.

The adapted cassette which is shown in FIG. 1 includes a flat bottom 1 that is substantially rectangular. The bottom 1 is organized so that the cassette can be adapted in different ways to form a plurality of possible types of cassette.

A discontinuous rim 2 surrounds the bottom. The segments 2A of the rim along the large sides of the bottom are straight, and the segments 2B of the rim along the small sides of the bottom are curved. Accesses such as 3 for the fibers that are received in the cassette are defined between the rim segments at the four corners of the bottom. Blocks 4 project from the bottom in the accesses 3. Each block is of substantially the same height as the rim and is triangular in cross-section. Each block divides the corresponding access into two distinct access channels 3A and 3B.

The rim 2 has tabs folded down parallel to the bottom towards the inside of the cassette, such as the two non-end tabs 5A on each segment 2A and the two nearly-end tabs 5B on each segment 2B. The bottom 1 has a pair of projecting tabs 6 that are analogous to and facing tabs 5A. Tabs 6 are slightly offset to one side of the middle longitudinal axis of the bottom, and are symmetrical about the middle transverse axis thereof.

The bottom is made of plastic and is molded. The rim, the tabs, and optionally the blocks are obtained directly when the bottom is molded.

The bottom 1 includes a plurality of openings, other than the openings required to achieve molding of the various tabs, and referred to by the overall reference 10 in FIG. 1. The openings 10 enable the various adaptations of the cassette to be performed. The openings are accurately delimited on the bottom, as described below with reference to FIG. 2.

The cassette of the "first" type shown in FIG. 1 further includes a cylinder 20 having two or three snap-fastening catches 21, and an optical fiber connection support 22 having three snap-fastening catches 23. The catches on the cylinder 20 and on the support 22 are received in some of the openings 10 so that the cylinder and the support can be removably mounted on the bottom, thereby adapting the resulting cassette which is then referred to as a cassette of the "first" type.

A cover 8 closes the adapted cassette. It is a separate cover, and when it is attached it covers the rim. For example, it is retained underneath projections 9 which form small opposite tabs on the rim, and/or it is fixed to the blocks 4 by means of screws, once the fibers received in the cassette have been coiled and connected, and once the connections are held on the support 22.

Figure 2:
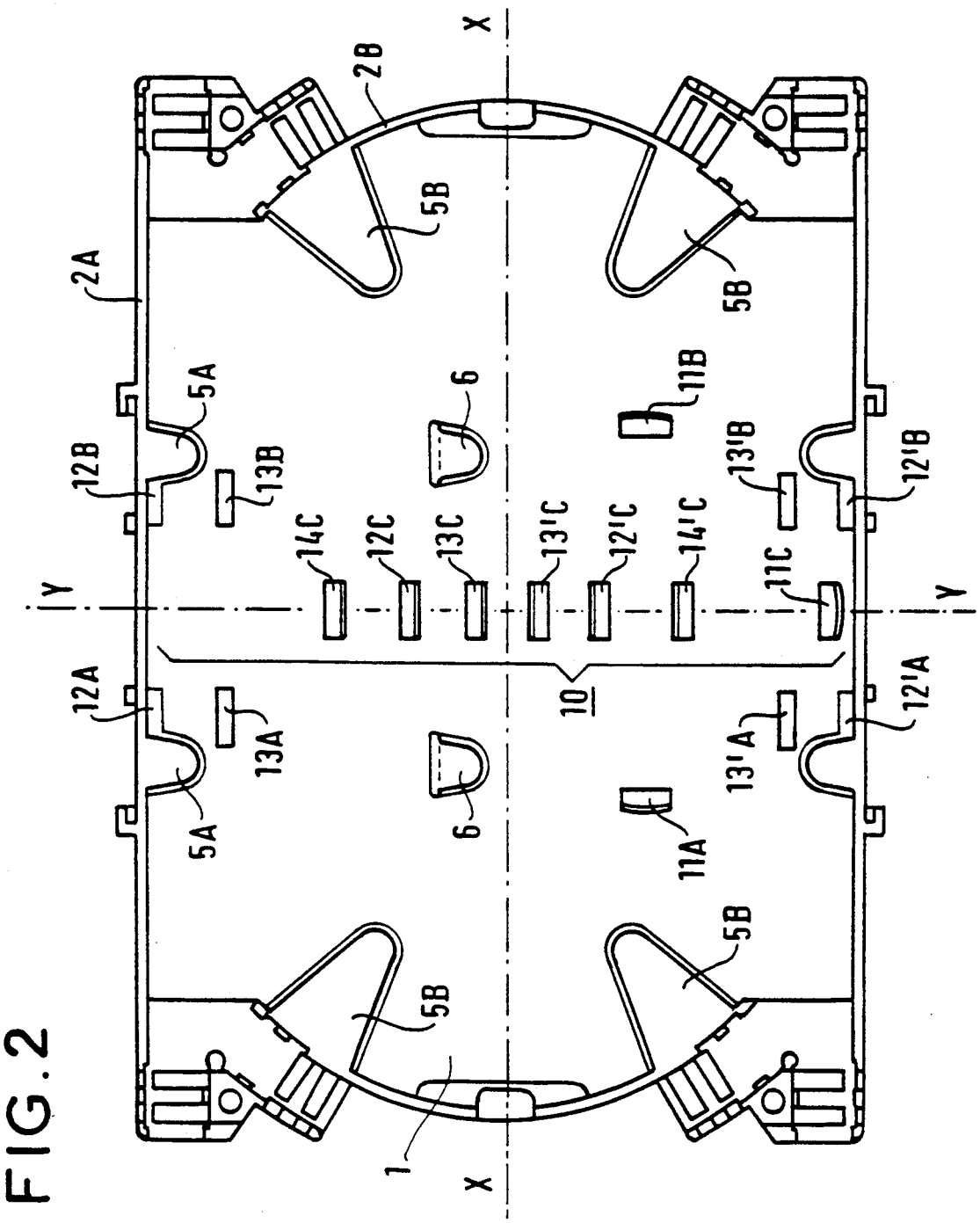
FIG. 2 is a plan view of the adaptable cassette of the present invention.

The above-mentioned openings, given the overall reference 10 in FIG. 1, are specified with reference to FIG. 2, by giving them individual references. They cooperate to define different sets of openings, each set being formed by three openings and having one of its openings centered on the middle transverse axis YY, and having its other two "side" openings symmetrical about that axis. The sets of openings are symmetrical about the middle longitudinal axis XX, with the possible exception of one of the sets, as shown.

In this way, the bottom 1 includes two side openings 11A, 11B on the same side of axis XX and substantially midway between that axis and the relevant segment 2A of the rim, and one opening 11C centered on axis XX and relatively close to said relevant segment 2A of the rim. The bottom further includes two groups of second sets of openings that are symmetrical about axis XX, as expressed in FIG. 2 by the "prime" symbol being added to the references of the openings in one of the two groups in question. One of the groups is formed by two side openings 12A, 12B adjacent to the relevant segment 2A and to the inside edges of the tabs 5A thereon, two other side openings 13A, 13B facing the last-mentioned side openings but offset from the segment 2A of the rim, and a series of third openings such as 12C, 13C, and 14C, centered on axis YY and relatively close to axis XX. Each of the third openings co-operates with two of the side openings 12A, 12B or 13A, 13B to define one of the different second sets of openings, which are assigned to fixing the various possible supports.

Figure 3:
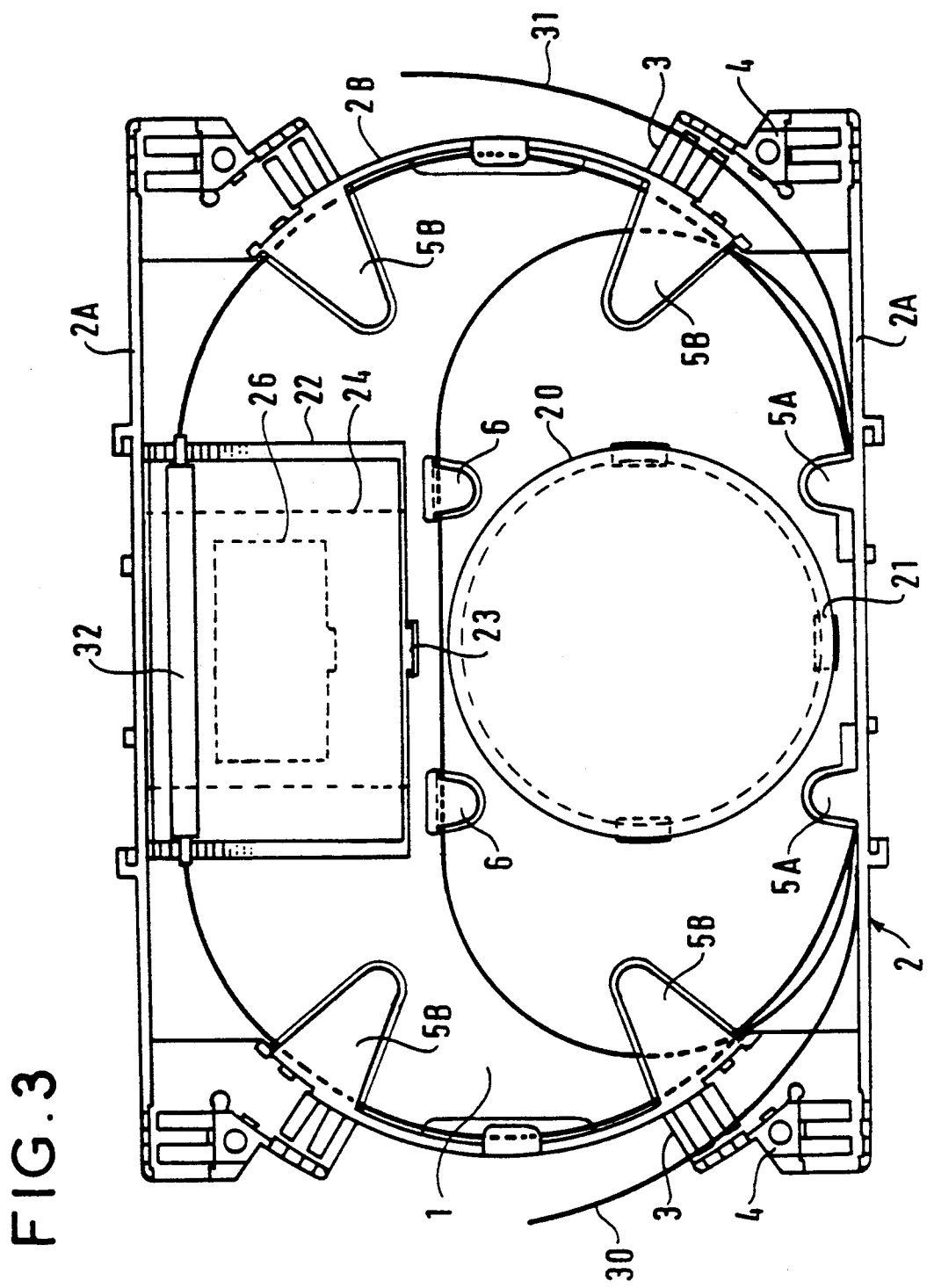
FIG. 3 is a plan view of the FIG. 1 "first type" of cassette showing the possible adaptations that can be made to the first type of cassette.

FIG. 3 shows a casette of the first type made in this way, and various possible adaptations that can be made to the cassette of the first type.

The cassette of the first type includes the above-mentioned cylinder 20 snap-fastened in the first set of openings 11A, 11B and optionally 11C, by means of the set of snap-fastening catches on the cylinder. The periphery of the cylinder extends over the space between the two tabs 5A and slightly onto the other side of axis XX to extend over the space between the two tabs 6. On the other side of axis XX the cassette includes the above-mentioned support 22, or one of two other possible supports 24 and 26, the support being snap-fastened in that set of openings which corresponds to the three snap-fastening catches on the support.

FIG. 3 also shows how the cassette of the first type is used, with two of the optical fibers 30, 31 being received in the cassette via two of the access channels belonging to respective ones of the two accesses 3 situated on either side of the cylinder 20 on that half of the bottom which carries the cylinder. The fibers are loosely coiled around the cylinder through at least one turn, and they are retained under the tabs 5A and 6 on either side of the cylinder. The end portions of the fibers follow the periphery of the cassette to the support 22, and are connected together via the connection 32 held in place on the support.

With respect to the various possible supports 22, 24, and 26, it should be noted that they are dimensioned as a function of the type of connection that they are capable of receiving, the types of connection being different from one support to another, and as a function of the number of fibers received in the cassette. It should also be noted, with reference to FIGS. 2 and 3, that using the two side openings 12A, 12B for fixing the selected support means that the two tabs 5A initially provided on the adjoining segment 2A of the rim must be removed.

Figure 4:
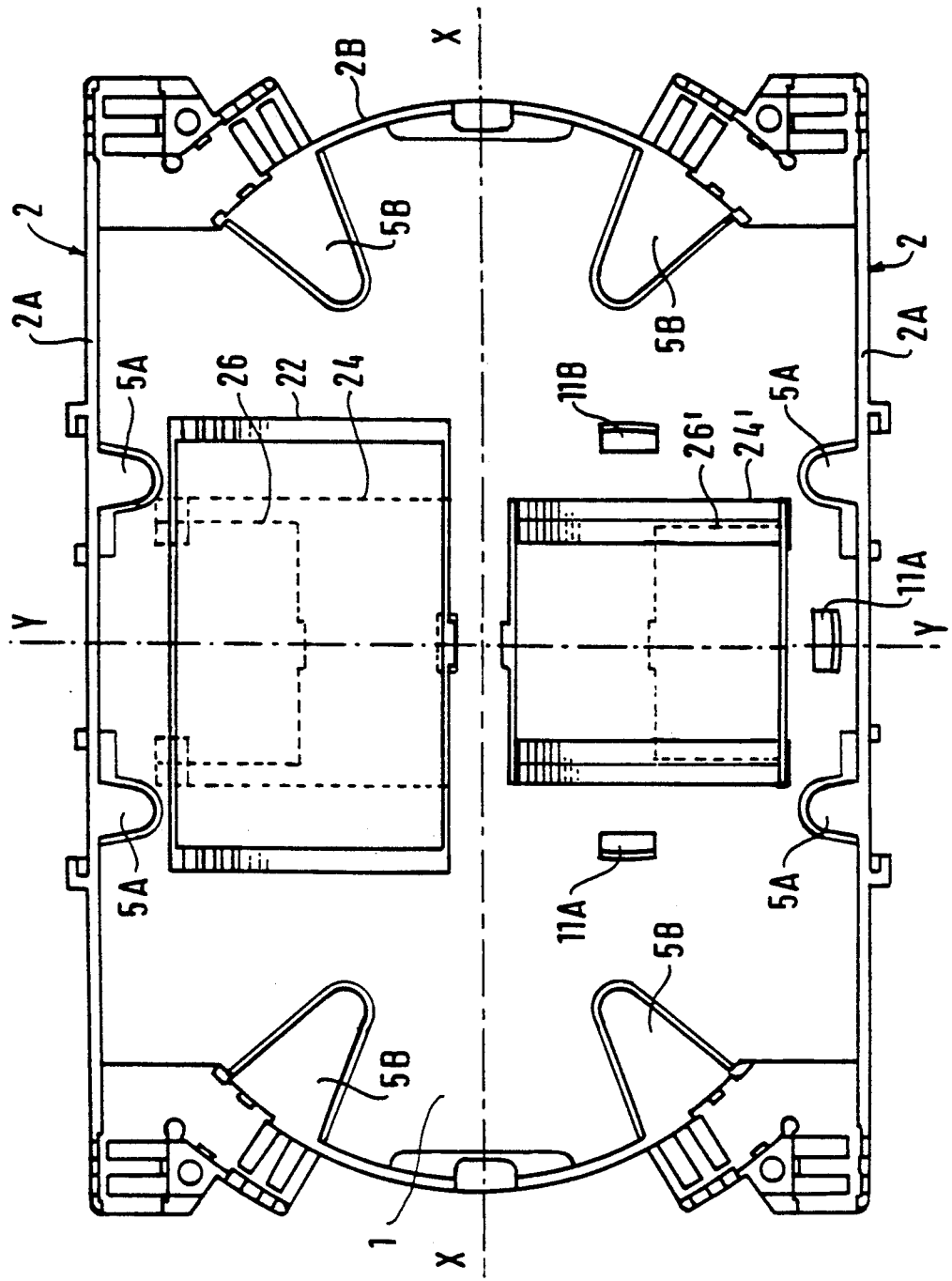
FIG. 4 is a plan view of the cassette of the invention shown in the form of a second type, showing the possible adaptations that can be made to the second type of cassette.

FIG. 4 shows a cassette of a second possible type, and the possible adaptations that can be made to the cassette of the second type.

The cassette of the second type does not have the above-mentioned cylinder on its bottom 1, but it does include two connection supports snap-fastened in two sets of openings on respective sides of axis XX.

Each of the supports can be selected from the different supports 22, 24, and 26 as a function of the connections used and of the number of fibers received in the cassette, the individually connected fibers being divided into two groups, and the connections in each group being retained on a corresponding one of the supports. Where two supports are analogous, they are given the same reference number, the reference number of one of the supports being followed by the prime symbol. The cassette may also receive a second support that is analogous to support 22.

In the cassette of the second type, the fibers (not shown) are coiled exclusively against the periphery of the cassette. Only side openings 13A and 13B are used, and not side openings 12A and 12B, so as to retain the tabs 5A on the two segments 2A of the rim. However, in this case, the tabs 6 initially provided on the bottom 1 (FIG. 2) are removed.

In a variant, the tabs 6 may be provided on one of the edges of the supports 22, 24, and 26, rather than on the bottom, and they may be broken off where applicable, depending on the adapted cassette that is required.

Figure 5:
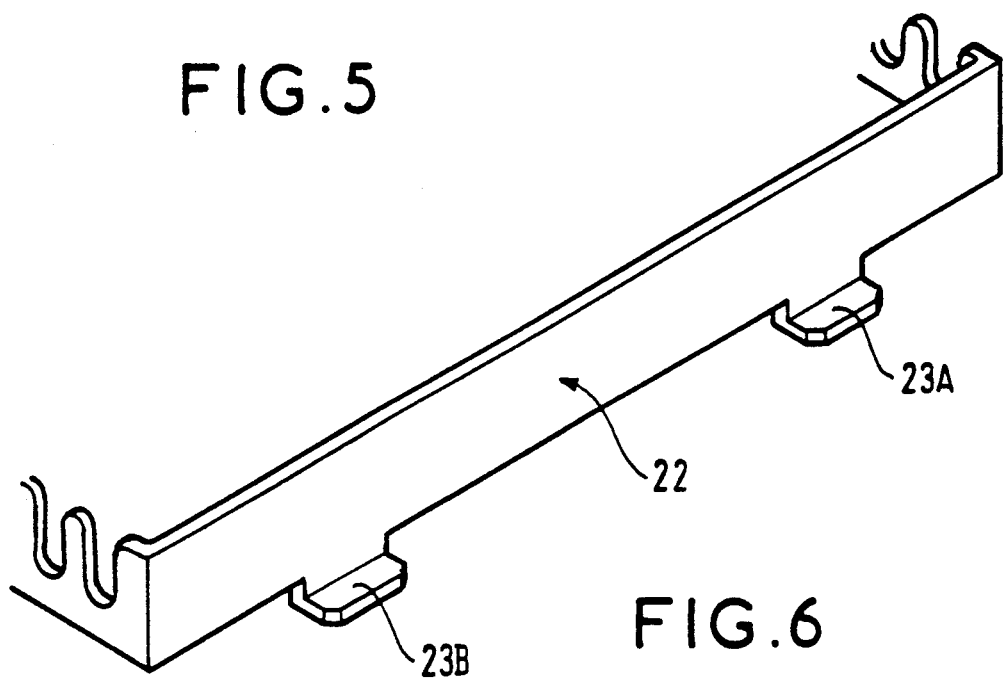
FIGS. 5 and 6 are two fragmentary perspective views of one of the elements that can be used to equip the adaptable cassette shown in FIG. 2.
Figure 6:
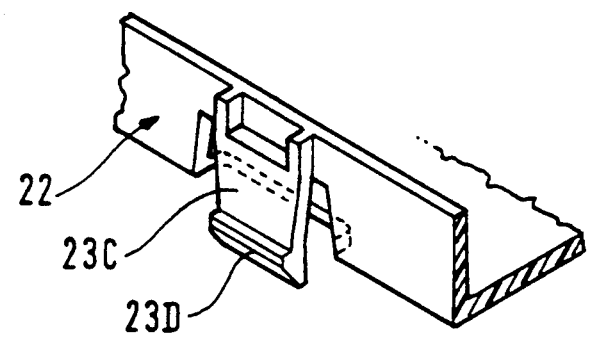
Figure 7:
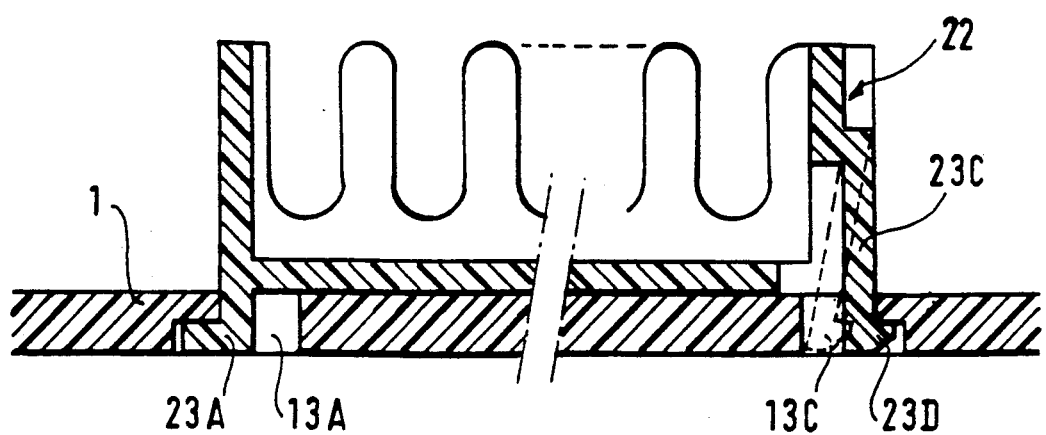
FIG. 7 is a broken fragmentary section view through one of the elements that can be used to equip the above-mentioned adaptable cassette.

FIGS. 5 to 7 show how an arbitrary one of the elements to be fixed to the bottom, such as the above-mentioned support 22, is snap-fastened thereon. FIG. 5 shows two of its catches referenced 23A and 23B which project outwardly from one of the edges of the support, and which are received in the two side openings of the corresponding set of openings. FIG. 6 shows the third catch of the support, referenced 23C, centered on and projecting from the opposite edge of the support, which catch is received in the third opening centered on the transverse axis and belonging to that set. FIGS. 5 to 7 show that the two catches 23A and 23B are straight, relatively rigid, and not very deformable, while catch 23C is flexible and elastically deformable. The first two catches such as 23A are engaged directly in the side openings such as 13A (or optionally 12A). Some clearance is left between the third catch 23C and the edge of the support on which the catch is formed, and the catch is terminated by a hooked tooth 23D. In this way, the third catch can be elastically deformed to a large extent so that it can be inserted into the opening 13C (or optionally 12C), and, by means of resilient return, the catch retains the support on the bottom sufficiently strongly.

The above-mentioned cylinder 20 has a rigid catch and an elastically deformable catch, the catches being substantially diametrically opposite and received in the side openings 11A and 11B of the corresponding set of openings (FIG. 2), and optionally a third catch that is substantially at 90° to the two last-mentioned catches, which third catch is elastically deformable and is received in opening 11C.

The snap-fastening catches engage under the bottom 1, as shown in FIG. 7, so that they do not project from underneath the bottom.

Figure 8:
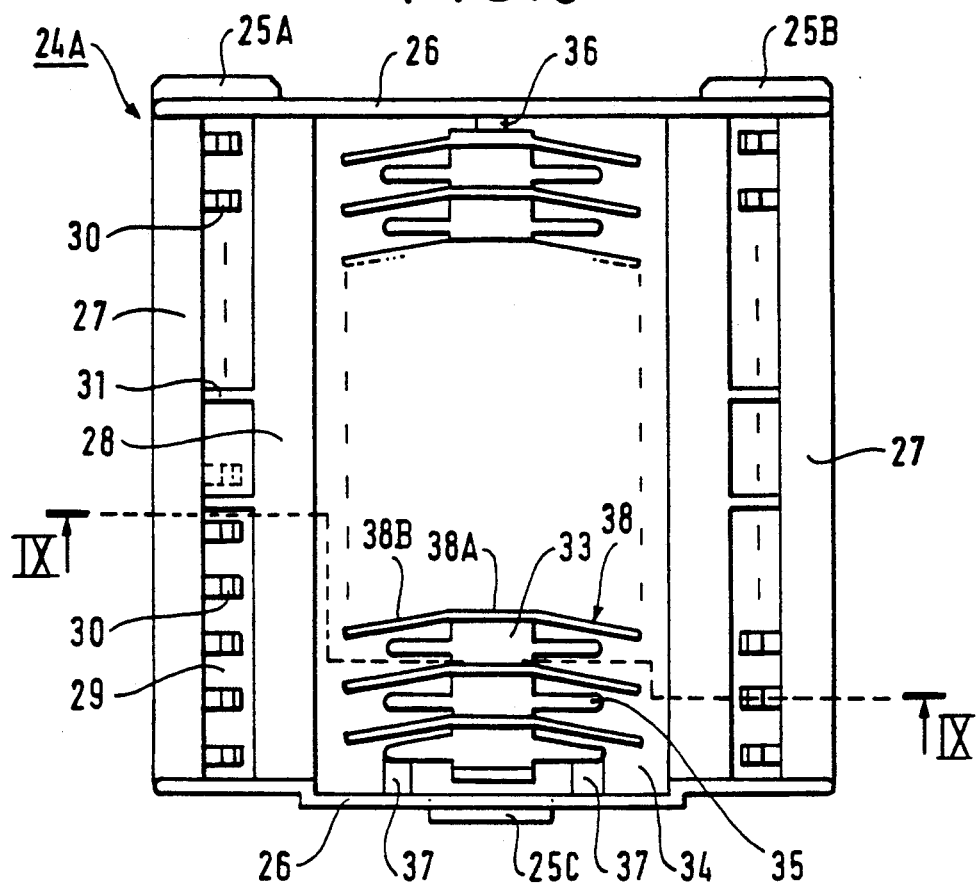
FIG. 8 is a plan view of one of the elements that can be used to equip the cassette shown in FIG. 2, the element being referred to as a "connection support" and in turn being adaptable to a first type of connection or to a second type of connection.
Figure 9:
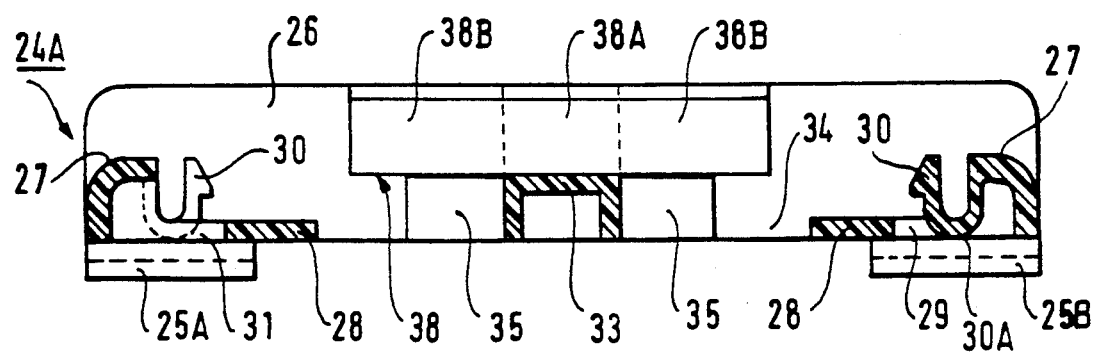
FIG. 9 is a section view on a larger scale, taken on the line IX—IX shown in FIG. 8.

FIGS. 8 and 9 show an "adaptable" support referenced 24A which is a variant on any one of or all of the above-mentioned supports. Support 24A corresponds operationally to the above-mentioned supports 24 and 26 (FIG. 3 or 4) and is selectively assigned to retaining the type of connection received by the support 24 or the different type of connection received by the support 26. The above-mentioned support 22 may in turn be made adaptable in the same way so as to receive its own specific connections or those received by support 26.

The dimensions of support 24A are the same as those of support 24. On two opposite edges 26 of support 24A, the two rigid snap-fastening catches are referenced 25A and 25B and the resilient third catch is referenced 25C. Each of the end portions along the two other edges of the support is divided into an "outer" portion 27 and an "inner" portion 28 by means of a recess 29 from which a row of small resilient teeth 30 project. The teeth 30 in one row are opposite and facing the teeth in the other row. First individual connections to which the two rows of teeth 30 are assigned can be retained between teeth of respective rows.

The rows of teeth 30 are connected to the edges 26. Two substantially middle link tabs 31 connect the outer portion 27 to the inner portion 28, the inner portion and the outer portion further being interconnected by the edges 26. The outer portion 27 is substantially level with the ends of the teeth 30, and the inner portion 28 is substantially level with the bases 30A of the teeth 30. The outside edge of the outer portion is rounded, and the inside edge thereof is connected to the bases of the teeth. The inner portion 28 forms an abutment surface for the bodies of the first connections retained between the teeth 30.

The support 24A includes a middle bridge 33 parallel to the rows of teeth 30 and separated both from them and from the two inner portions 28 by two recesses 34 on respective sides of the bridge. The edges of the bridge are widely crenelated to delimit side tabs 35 at the same pitch as and facing the teeth 30. One end of the bridge is connected to one of said opposite edges 26 of the support by means of an axial fastening 36, and the other end of the bridge is connected to the other opposite edge 26 by means of two fastenings 37. The fastenings are of small cross-section and they may made such that they can be cut or broken by rotating the bridge about the fastenings, so as to enable the bridge to be removed if necessary.

The bridge carries a row of transverse ribs 38 projecting therefrom. The bridge divides each rib into a central portion 38A, integral with the bridge and over the width thereof, and two side portions 38B referred to as "deformable fins". The fins extend the central portions of the ribs on either side of the bridge and they slope the same way from the central portions. The deformable fins of one of the ribs and the central portion of the next rib cooperate to retain a corresponding second type of connection between them, which connection rests on the bridge and on the two side tabs 35 between the two ribs in question. The top edge of each of the fins is preferably chamfered over the connection-retaining face thereof to facilitate insertion of the connection.

The bridge 33 is an upside-down channel-section piece for ease of molding the support 24A. The web of the channel-section is substantially level with the teeth 30. The bridge can be removed at will, or retained, depending on the connections selected. If the bridge is removed, it enables the connections to be mounted between the two rows of teeth 30. If the bridge is retained, it renders the two rows of teeth 30 inactive.

In a variant of the above-described examples, it should be noted that the bottom may receive a single support that is wider than the above-mentioned supports, and that is snap-fastened in the side openings 13A and 13B (or 13'A and 13'B) and in one of the central openings 13'C, 12'C, and 14'C (or 13C, 12C, 14C) which correspond to the single support.

We claim:

1. An adaptable cassette for coiling and splicing optical fibers, said cassette including a bottom, a discontinuous rim substantially around the periphery of the bottom, retaining tabs on the rim, with the fibers being held underneath the tabs, holding means for holding optical fiber connections on the bottom, a closing cover attached to the rim, and optionally a cylinder on the bottom so that the fibers can be coiled around the cylinder and/or against the rim; wherein said bottom is plane and includes, at least on one side of a middle longitudinal axis, a first set of openings assigned to the optional removable fixing of said cylinder on said bottom, and, symmetrically on either side of said middle longitudinal axis, a plurality of openings co-operating to define a plurality of different second sets of openings, each set being assigned to the removable fixing of a connection support chosen from different supports, and selectively constituting said holding means, and wherein said cylinder is provided with a set of snap-fastening catches which fasten into said first set of openings, and each of said different supports is provided with its own set of snap-fastening catches which fasten into one of said second sets of openings.

2. A cassette according to claim 1, including said cylinder and one of said different supports mounted on said bottom on either side of said middle longitudinal axis, or two of said supports mounted on said bottom on either side of said middle longitudinal axis.

3. A cassette according to claim 1, wherein each of said second sets of openings is formed by three openings, one opening being centered on the middle transverse axis of the bottom, and the other two openings being symmetrical about said transverse axis and being referred to as "side openings", and in that the set of snap-fastening catches on each of said supports is formed by three snap-fastening catches.

4. A cassette according to claim 3, wherein said second sets of openings are defined on either side of said longitudinal axis by two side openings adjoining said rim, two other side openings facing the preceding openings but offset from the rim, and a series of third openings centered on said transverse axis.

5. A cassette according to claim 3, wherein the set of snap-fastening catches on each support is defined by two rigid catches received in the two side openings of the set of openings in question, and an elastically deformable catch received in the central opening of said set of openings in question.

6. A cassette according to claim 5, wherein the different supports have different dimensions so as to hold different connections and/or to hold a variable number of connections.

7. A cassette according to claim 1, wherein said snap-fastening catches engage under said bottom, so that they do not project from under the bottom when said cylinder and/or said support to which they belong is fastened on the bottom.

8. A cassette according to claim 1, wherein, at the four corners of the substantially rectangular bottom, the cassette has four possible selectable accesses for the fibers, said accesses being delimited by the end portions of the segments of said rim, two opposite ones of said segments of the rim being straight, and the two other segments being curved and between the two straight segments, said cassette further having projecting blocks on the bottom in said accesses, dividing each access into two access channels which are in turn selectable in each selected access.

9. A cassette according to claim 1, wherein at least one of said different supports includes a first set and a second set of individual retaining means for respectively retaining first and second connections, on which support said first set extends in two first parallel rows situated substantially between the ends of two first edges of the support and assigned to retaining the first connections between the two first rows, and said second set extends in a third row parallel to and between said first parallel rows, and assigned to retaining the second connections on the third row and making said first rows inactive, and wherein said third row is fixed to said first edges of the support by end fastenings of small cross-section and made breakable, so that the third row can be removed when said first connections are selected.

10. A cassette according to claim 9, wherein said third row forms a middle bridge equipped with said end fastenings between said first edges of the support, on which middle bridge the corresponding individual means are constituted by projecting ribs each divided into a "central" portion over the width of said bridge, and two "side" portions on either side of said bridge and sloping the same way from the central portions of said ribs.

11. A cassette according to claim 10, wherein said bridge further has side tabs extending substantially level with the bridge on either side of the bridge and between the successive ribs.

* * * * *